A. ROBERTS.
AMMONIA STILL AND THE LIKE.
APPLICATION FILED JULY 6, 1920.

1,379,939.

Patented May 31, 1921.
2 SHEETS—SHEET 1.

Inventor.
Arthur Roberts

A. ROBERTS.
AMMONIA STILL AND THE LIKE.
APPLICATION FILED JULY 6, 1920.
1,379,939.
Patented May 31, 1921.
2 SHEETS—SHEET 2.
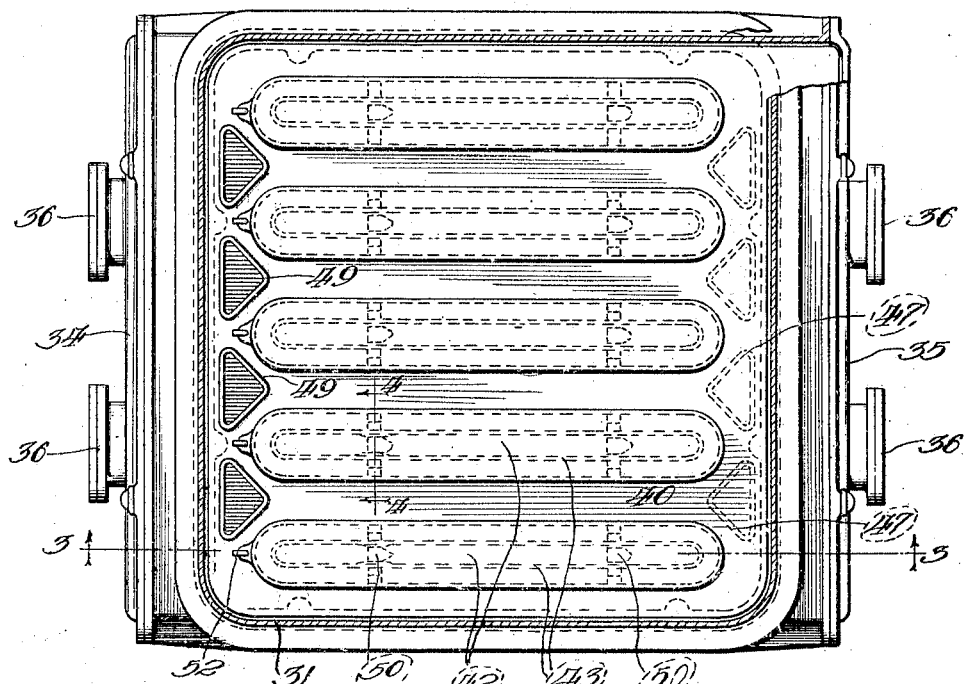
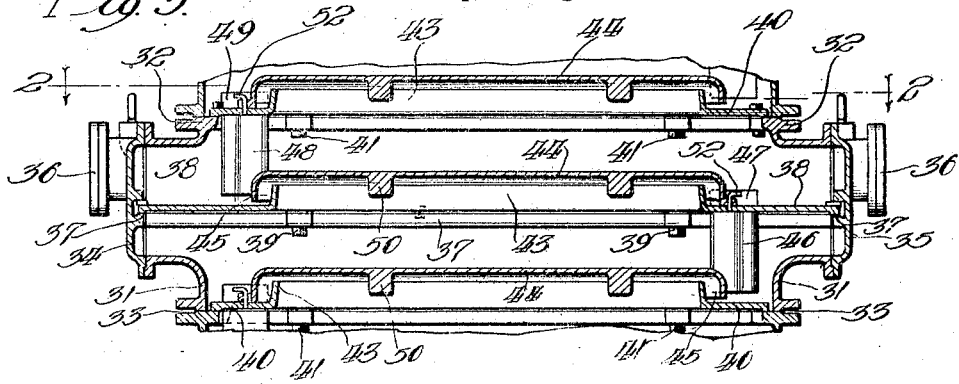
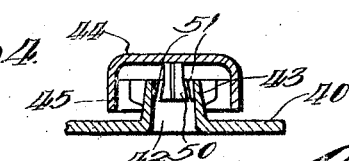
Inventor.
Arthur Roberts

UNITED STATES PATENT OFFICE.

ARTHUR ROBERTS, OF EVANSTON, ILLINOIS, ASSIGNOR TO AMERICAN COKE & CHEMICAL COMPANY, OF CHICAGO, ILLINOIS, A CORPORATION OF MAINE.

AMMONIA-STILL AND THE LIKE.

1,379,939. Specification of Letters Patent. Patented May 31, 1921.

Application filed July 6, 1920. Serial No. 394,306.

*To all whom it may concern:*

Be it known that I, ARTHUR ROBERTS, a citizen of the United States, residing at Evanston, in the county of Cook and State of Illinois, have invented certain new and useful Improvements in Ammonia - Stills and the like, of which the following is a specification.

This invention has to do with improvements in ammonia stills and the like; and it has reference particularly to the construction and operation of the stills for the recovery of ammonia and its compounds or derivatives from various mother liquids in which it may be contained. I may state in the first place that the ammonia still herein disclosed is very well adapted for the recovery of the ammonia from coke oven distillate gases, but I do not limit myself to this particular use or application of the features of invention, except as I may do so in the claims.

In order that the various features of construction and combinations of elements hereinafter disclosed may be more easily understood and their significance appreciated, I will first state briefly some of the conditions and circumstances attendant upon the treatment of these gases.

Ordinarily the gases include the volatile constituents such as ammonium carbonate $(NH_4)_2CO_3$; ammonium sulfid $(NH_4)_2H_2S$; and other similar compounds; and the non-volatile constituents such as ammonium chlorid $NH_4Cl$; ammonium sulfo-cyanid $NH_4CNS$; ammonium sulfate $(NH_4)_2SO_4$; and other similar compounds. The so-called volatile constituents including those above mentioned may generally be removed from the mother liquid by the simple application of heat by which they are volatilized and driven off from the liquor; but the so-called non-volatile constituents must be converted into the compounds of a volatile nature before they can be volatilized by the application of heat. Such conversion of most of the non-volatile constituents may be effected by the application of lime to the mother liquor.

The treatment of many liquors for the conversion of these so-called non-volatile constituents by the use of lime or milk of lime, and the volatilization of the volatile constituents by the simple application of heat has been well known and practised in the past; but it is found that stills or evaporators in which these processes are carried on tend to become coated by deposits of various non-soluble salts with consequent reduction of the efficiency of processes and serious impairment of the capacity of the plant.

One of the objects of the present invention is to provide a construction of still such that the parts which tend to become coated in this manner may be readily removed from the casing or chamber within which they are normally contained without having to interfere with or dismantle any portions or sections of the casing or chamber other than those containing such parts.

Another feature of the invention has reference particularly to the construction of the trays and bells themselves. In this connection I may state that in those cases in which the liquor passes down over a series of successive trays, it is necessary to provide suitable ports or weirs over or through which the liquor passes in its descent from tray to tray. In order to secure the best possible operation of the machine, it is desirable to so construct these ports or weirs as to secure a maximum amount of surface or a maximum length of weir over which the liquor may flow, but it is desirable at the same time to keep the size of the parts as small as possible. Another object of the invention is, in machines of this type, to so form and construct the parts that the maximum length of weir may be secured without undesirable increase in the size of the trays or bells.

Other objects and uses of the invention will appear from a detailed description of the same, which consists in the features of construction and combinations of parts hereinafter described and claimed.

In the drawings:

Fig. 2 shows a plan view of one of the trays, being a section taken on the line 2—2 of Fig. 3, looking in the direction of the arrows;

Fig. 3 shows a vertical fragmentary section taken on line 3—3 of Fig. 2, looking in the direction of the arrows; and Fig. 4 shows a fragmentary cross-section through one of the bells at the point where the same is locked to the tray, being taken on the line 4—4 of Fig. 2, looking in the direction of the arrows, but on enlarged scale.

Figure 1:
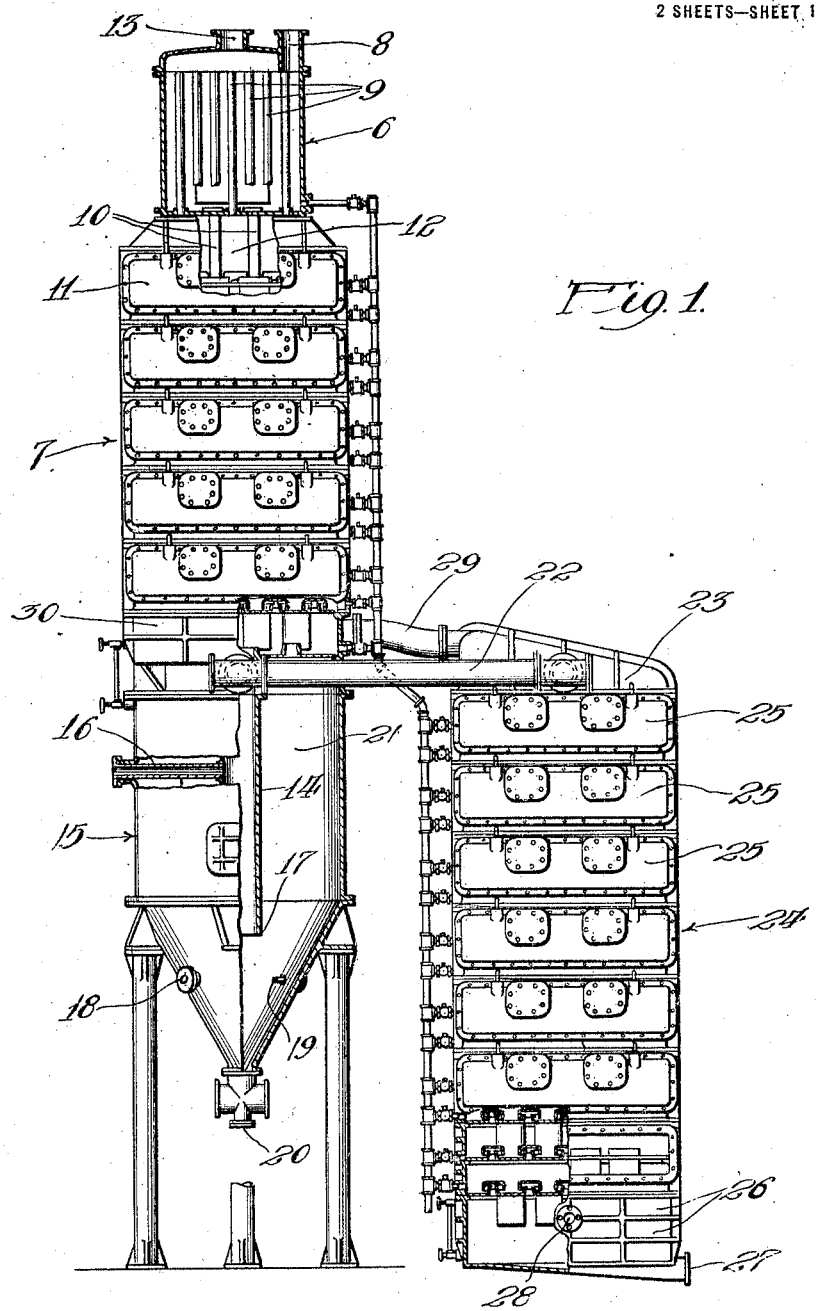
Figure 1 shows an elevational view of a plant for treating distillate gases and embodying the features of the present invention, some portions of the plant being broken away in section so as to better illustrate the interior construction of the parts.

In order that the general construction and operation of the apparatus may be better understood, I will first have reference to a description of Fig. 1, and will then refer to Figs. 2, 3 and 4, for a description of the detailed construction and operation of certain portions of the device. I wish to state, however, that in describing the construction and operation of a particular installation as shown in Fig. 1 I do not intend thereby to limit the use or application of the features of the present invention to the particular arrangement or combination shown in Fig. 1, since manifestly many of the features may be used in other combinations or arrangements.

Bearing the foregoing in mind, there are illustrated in Fig. 1 a heat exchanger 6 which surmounts a series of evaporating or vaporizing sections designated in their entirety by the numeral 7. The raw liquor passes first through the heat exchanger 6, entering the same through the connection 8, and passing down around a series of tubes or the like 9 through the connections 10 to the trays in the top section 11. These trays, whose detailed construction will be presently explained, are so arranged that the liquor trickles down through or over them from section to section against the counter current flow of steam or vapor. This steam or vapor passes up from the space 12 above the upper section 11 and through the tubes 9 of the heat exchanger 6 to the vapor discharge connection 13 through which the ammonia vapors and gases are delivered from the apparatus.

The number of evaporating units in the section 7 may be made as large as desirable, depending somewhat upon the capacity of the apparatus and depending also upon the relative proportion of volatile constituents contained within the raw liquor. The function of the section 7 is to vaporize the volatile constituents and drive them off as completely as possible, so that when the liquor passes away from the section 7 it will contain practically no ammonia except in "fixed" form.

From the final or lower unit of the volatile section 7, the liquor passes by way of a pipe or down-comer 14 into the lower portion of a conversion section designated in its entirety by the numeral 15. As the liquor passes down through the pipe 14, it meets an incoming current of milk of lime delivered through the pipe 16, so that the liquor delivered from the lower end 17 of the pipe 14 comprises a mixture of liquor containing a proportion of milk of lime dependent upon the amount of milk of lime introduced through the pipe 16. In the lower portion of the conversion section 15, there are located one or more nozzles or pipes 18, 19, and 20, through which steam may be introduced into the mixture so as to agitate it and raise its temperature.

The mixture then rises through the space 21 surrounding the pipe 14 and passes by way of a connection 22 into the top portion 23 of another series of evaporating or vaporizing units 24 which may be designated in its entirety as the non-volatile or fixed section. As a matter of fact, the treatment by the milk of lime or the like in the section 15 converts the majority of the so-called fixed constituents into ammonia compounds which may be vaporized by the action of heat.

In the section 24, the liquor passes down over a series of trays in the various units 25 and against a counter current flow of steam or the like to the bottom unit 26 wherein the sludge collects and may be delivered through a connection 27. The steam is introduced through one or more connections 28 into the unit 26.

The ammonia vapors which are volatilized in the section 24 pass by the connection 29 into the lower unit 30 of the section 7 and then rise through the various units of the section 7 against the counter current flow of liquor, mingling with the freshly vaporized or volatilized ammonia gases which are vaporized in the units of the section 7, so that all of the vapors both from the sections 7 and 24 find their way through the heat exchanger 6 to the delivery point 13.

I will now explain in detail the construction of each of the vaporizing or volatilizing units. These are shown in detail in Figs. 2, 3 and 4. Each unit includes a relatively shallow rectangular casing 31 having a flange 32 on its upper edge, and a downwardly extending lip 33 on its lower edge, so that when the units are built up one on top of the other the lip 33 of each unit rests or stands on the flange 32 of the next lower unit.

The two sides 34 and 35 are removable from the balance of the casing being normally held in place by bolts or in any other suitable manner. Manholes 36 may be provided in these end sections, if desired, to gain access to their interior portions for some purposes.

Around the central portion of each unit, including its side sections 34 and 35 is a ledge or sill 37 upon which is normally supported a tray 38 of cast iron or other suitable material. The side sections 34 and 35 are of sufficient breadth to permit the tray 38 to be directly withdrawn upon removing one or the other of said side sections. This fact will be readily evident from an examination of Fig. 2. Tap screws or the like 39 may be provided for holding the tray normally in position on the sill 37.

The ledge 32 extends inward a sufficient distance to provide a sill upon which may be mounted another tray 40 which is somewhat smaller in size than the tray 38. This tray 40 may be held in place by a series of tap screws or the like 41.

It will be observed particularly from an examination of Fig. 3 that upon removing one of the side plates 34 or 35, and upon removing the central tray 38, the corresponding tray 40 may be removed without disturbing any of the other units of the apparatus.

Along the central portion of each of the trays 38 and 40, there is provided a series of elongated openings 42, each of which is surrounded by an upstanding flange 43. These flanges will necessarily prevent a down flow of liquor through the passages 42 as long as the liquor does not stand at a greater elevation than the flanges.

Over each of the openings 42 and its flange 43 is located a bell 44 having a downwardly depending flange 45 which is separated some distance from the correspondig upstanding flange 43 and thus provides, in conjunction with said flange 43, a peripherally extending slotted passage. Gas flowing up through the openings 42 is compelled to break through the body of the liquor standing on the tray in order to pass beneath the corresponding flanges 45, which flanges thus constitute inverted weirs.

Along one side of each of the trays 38 is a series of downwardly depending overflow pipes or the like 46, the lower ends of which reach to a point near the surface of the next lower tray, and preferably beneath the normal level of liquor standing on said tray. A flange 47 surrounds the upper end of each of these pipes 46 and stands up a distance somewhat less than the corresponding flange 43. Consequently the liquor may overflow the flange or weir 47 and pass down to the next lower tray before overflowing the flange 43.

A series of pipes 48 similar in construction to the pipes 46 is located along the opposite edge of each of the trays 40, and above each of the pipes 48 is an inverted weir 49 also of somewhat less elevation than the flanges 43. By placing the pipes 48 and the pipes 46 at opposite sides of the apparatus, the liquor is compelled to flow back and forth as it descends from tray to tray.

It will be observed from an examination of Fig. 2 in particular, that each of the pipes 46 and 48 is of triangular form, and it will also be observed that the end portions of the bells 44 are rounded or curved so that the triangular form of the pipes correspond in a general way to the spaces between the end portions of the said bells. It will also be observed that the use of a triangular shaped pipe and an inverted weir insures the presence of a relatively large amount of spillway for the down flowing liquor in conjunction with the fact that this configuration fits in well with the shape of the trays and bells.

An examination particularly of Figs. 2 and 4 discloses the presence of a downwardly depending lug or wedge-shaped locking device 50 adjacent to each end of each of the bells. These lugs coöperate with beveled or tapered abutments 51 on the inner surfaces of the flanges 43 so that by setting the bells down into place on said flanges and then shifting the bells endwise a slight distance, they will be locked into position and may be secured in such position by the use of keys or the like 52, as clearly shown in Figs. 2 and 3.

I wish to emphasize the fact that the construction herein disclosed is such that the trays of any unit can be very readily removed without any disturbance to the remaining units and without the necessity of taking down the units above that one which is being repaired or cleaned. I wish also to particularly point out of the fact that the arrangement is such as to insure a relatively large overflow surface or spillway within a very compact construction.

I claim:

1. In an ammonia still the combination of a vaporizing section for volatile constituents, a heat exchanger above said vaporizing section, a connection for the delivery of liquor from the heat exchanger to the upper portion of said vaporizing section, a connection for the delivery of vapors from the upper portion of said vaporizing section to the heat exchanger, a conversion section beneath said vaporizing section, a connection for the delivery of liquor from the lower portion of said vaporizing section to the conversion section, a connection for the delivery of milk of lime into the conversion section, a vaporizing section for the treatment of fixed constituents, a connection for the delivery of treated liquor from the conversion section to the upper portion of said last named vaporizing section, a connection for the delivery of vapor from the upper portion of the last named vaporizing section to the lower portion of the first named vaporizing section, and a connection for the delivery of steam into the lower portion of the vaporizing section for fixed constituents, each vaporizing section comprising a series of units mounted in vertical alinement, each unit being of rectangular form and having elongated openings at opposite sides, cover plates for said openings, a sill in the central portion of each end of each section, a removable tray seated on said sills and of size appropriate for removal through one of the side openings when uncovered, a sill on the upper edge of each unit for the accommodation of a tray of smaller size than the first-mentioned tray, there being a series of elongated central openings in each tray, an upstanding collar surrounding each of said openings, an inverted bell located over each of said openings and having a downwardly depending flange reaching to a point below the upper edge of the corresponding collar, means for locking each bell in position with respect to the corresponding collar, a series of overflow pipes downwardly depending from each tray to a point adjacent to the next lower tray, said overflow pipes being of triangular form and spaced between the end portions of the bells, and a triangular flange upstanding from each tray around the upper end of each overflow pipe to a point of lower elevation than the collar of said tray, substantially as described.

2. In an ammonia still a vaporizing unit of rectangular form having elongated openings at opposite sides, cover plates for said openings, oppositely disposed sills at the ends of the unit, a tray seated on said sills and of size appropriate to pass through one of the end openings when uncovered, another inwardly projecting sill on the upper edge of the unit and a tray seated thereon of smaller size than the first mentioned tray, each tray having a series of parallel elongated openings, an upstanding collar surrounding each of said openings, a bell located above each opening and having a downwardly depending flange reaching from a point below the upper edge of the corresponding collar, the end portions of said bells being rounded, a series of downwardly depending overflow pipes located between said end portions and reaching to a point adjacent to the next lower tray, each of said overflow pipes being of triangular form with the apex of the triangle between the bells and an upstanding triangular flange in conjunction with the upper end of each overflow pipe, substantially as and for the purpose set forth.

3. In an ammonia still a vaporizing unit of rectangular form having an elongated opening in one of its sides, a cover for said opening, a sill within the unit, a tray removably mounted on said still and of size appropriate to pass through the opening when uncovered, said tray having a series of parallel elongated openings, an upstanding collar surrounding each of said openings, a bell located above each opening and having a downwardly depending flange encircling the corresponding collar, one end portion of each bell being rounded, a series of downwardly depending overflow pipes located between the rounded end portions of the bells and reaching to a point adjacent to the next lower tray, said overflow pipes being of triangular form with their apexes located between the bells and an upstanding triangular flange in conjunction with the upper end of each overflow pipe with its apex located between the ends of the bells, substantially as and for the purpose set forth.

4. In a device of the class described, a tray for a vaporizing unit having a series of elongated parallel openings, an upstanding collar surrounding each of said openings, a bell in conjunction with each opening and having a downwardly depending flange encircling the corresponding collar, one end of each bell being rounded, there being a series of overflow openings in the tray, and a triangular upstanding flange in conjunction with each of said openings, each flange having its apex located between the ends of the adjacent bells, substantially as and for the purpose set forth.

5. In an ammonia still a vaporizing unit of rectangular form having elongated openings at opposite sides, cover plates for said openings, oppositely disposed sills at the ends of the unit, a tray seated on said sills and of size appropriate to pass through one of the end openings when uncovered, another inwardly projecting sill on the upper edge of the unit and a tray seated thereon of smaller size than the first mentioned tray, each tray having a series of openings and an upstanding collar surrounding each such opening, a bell located above each said opening and having a downwardly depending flange reaching from a point below the upper edge of the corresponding collar, and a series of downwardly depending overflow pipes in the tray reaching from a point of lower elevation than the upper edge of the collars of the tray down to a point below the tray, substantially as and for the purpose set forth.

6. In an ammonia still a vaporizing unit of rectangular form having an elongated opening at one side, a cover plate for said opening, sills in the unit at a point below its upper edge, a tray seated on said sills and of size to pass through the opening aforesaid when uncovered, an inwardly projecting sill on the upper edge of the unit and a tray seated thereon of smaller size than the first mentioned tray, each tray having a series of openings and an upstanding collar surrounding each such opening, a bell located above each said opening and having a downwardly depending flange reaching from a point below the upper edge of the corresponding collar, and a series of downwardly depending overflow pipes in the tray reaching from a point of lower elevation than the upper edge of the collars of the tray down to a point below the tray, substantially as and for the purpose described.

7. In an ammonia still the combination of a vaporizing section for volatile constituents, a heat exchanger above said vaporizing section, a connection for the delivery of liquor from the heat exchanger to the upper portion of said vaporizing section, a connection for the delivery of vapors from the upper portion of said vaporizing section to the heat exchanger, a conversion section beneath said vaporizing section, a connection for the delivery of liquor from the lower portion of said vaporizing section to the conversion section, a connection for the delivery of milk of lime into the conversion section, a vaporizing section for the treatment of fixed constituents, a connection for the delivery of treated liquor from the conversion section to the upper portion of said last named vaporizing section, a connection for the delivery of vapor from the upper portion of the last named vaporizing section to the lower portion of the first named vaporizing section, and a connection for the delivery of steam into the lower portion of the vaporizing section for fixed constituents, each vaporizing section comprising a series of units mounted upon each other, each unit being of rectangular form and having an elongated opening on one side, a cover plate for such opening, a sill in the central portion of each unit, a removable tray seated on said sill and of size appropriate for removal through the side opening when uncovered, a sill on the upper edge of each unit for the accommodation of a tray of smaller size than the first-mentioned tray, whereby any of the trays of a section may be removed from their units without disturbance of the remaining sections and units and simply with the removal of the proper units covers, there being openings in the trays and flanges surrounding said openings, and bells above the openings, and there being suitable pipes leading from the trays to the trays below them for the transfer of liquor downwardly from tray to tray, substantially as and for the purpose described.

ARTHUR ROBERTS.

Witness:
Thomas O. Banning, Jr.